US008719315B2

(12) United States Patent
Schüler et al.

(10) Patent No.: US 8,719,315 B2
(45) Date of Patent: May 6, 2014

(54) REPRESENTATION OF BUSINESS OBJECT IN ANALYTICAL APPLICATION BY COMBINING REPLICATED, ANALYTICAL, AND LOCALLY ENRICHED DATA

(75) Inventors: Arnulf Schüler, Heidelberg (DE); Huaiyang Mao, Walldorf (DE); Sonja Zscherpel, Walldorf (DE); Eduard Hess, Wiesloch (DE); Shabana Ansari, Wiesloch (DE); Martin Zielonkowski, Freinsheim (DE); Dagmar Opitz, Sandhausen (DE); Rolf Schumann, Bad Schoenborn (DE); Sven-Eric Eigemann, Sandhausen (DE); Lan Zhang, Walldorf (DE); Thomas Maag, Reilingen (DE); Marcel Kieser, Wiesloch (DE)

(73) Assignee: SAP AG, Walldorf (DE)

( * ) Notice: Subject to any disclaimer, the term of this patent is extended or adjusted under 35 U.S.C. 154(b) by 68 days.

(21) Appl. No.: 13/588,853

(22) Filed: Aug. 17, 2012

(65) Prior Publication Data
US 2014/0052752 A1 Feb. 20, 2014

(51) Int. Cl.
*G06F 17/30* (2006.01)
(52) U.S. Cl.
USPC ........... 707/804; 707/736; 707/758; 707/790; 706/1; 706/45
(58) Field of Classification Search
None
See application file for complete search history.

(56) References Cited

U.S. PATENT DOCUMENTS

| | | | | |
|---|---|---|---|---|
| 7,814,459 | B2* | 10/2010 | Behnen et al. | 717/104 |
| 8,046,326 | B2* | 10/2011 | Ameling et al. | 707/610 |
| 8,176,083 | B2* | 5/2012 | Vossen et al. | 707/796 |
| 8,484,167 | B2* | 7/2013 | Glania et al. | 707/687 |
| 8,577,837 | B2* | 11/2013 | Wintel et al. | 707/610 |
| 8,583,678 | B2* | 11/2013 | Vainer et al. | 707/769 |
| 2007/0156742 | A1* | 7/2007 | Gonzalez | 707/102 |
| 2008/0034015 | A1* | 2/2008 | Behnen et al. | 707/204 |
| 2008/0077549 | A1* | 3/2008 | Glania et al. | 707/1 |
| 2008/0120129 | A1* | 5/2008 | Seubert et al. | 705/1 |
| 2009/0112908 | A1* | 4/2009 | Wintel et al. | 707/102 |
| 2009/0172003 | A1* | 7/2009 | Jentsch et al. | 707/102 |
| 2010/0070556 | A1* | 3/2010 | Heusermann et al. | 709/202 |
| 2010/0161627 | A1* | 6/2010 | Vossen et al. | 707/755 |
| 2011/0022431 | A1* | 1/2011 | Ameling et al. | 705/7 |
| 2011/0307398 | A1* | 12/2011 | Reinhardt et al. | 705/319 |

OTHER PUBLICATIONS

Merve Adrian and Colin White, "Analytic Platforms: Beyong the Traditional Data Warehouse", BeyeNetwork Global coverage of the business intelligence ecosystem, 2010.*

\* cited by examiner

*Primary Examiner* — Hung Le
(74) *Attorney, Agent, or Firm* — Mintz Levin Cohn Ferris Glovsky and Popeo, P.C.

(57) ABSTRACT

A system, method, and computer program product for combining replicated, analytical, and locally generated data in business objects on top of a database are disclosed. Business data are replicated from a first source to an analytics database. Analytical data based on the replicated business data are generated and combined with the replicated business data in the analytics database. Business objects are created to allow access to the analytics database via a user interface. Related apparatus, systems, techniques and articles are also described.

20 Claims, 6 Drawing Sheets

FIG. 6 (Run Time)

REPRESENTATION OF BUSINESS OBJECT IN ANALYTICAL APPLICATION BY COMBINING REPLICATED, ANALYTICAL, AND LOCALLY ENRICHED DATA

TECHNICAL FIELD

This disclosure relates generally to data processing and in particular, to combining replicated, analytical, and locally generated data in business objects on top of a single database.

BACKGROUND

Previously, analytical and transactional data were typically separated by system boundaries—the analytical data residing in a different system (e.g. a Business Intelligence System or Data Warehouse) from the transactional system (e.g. an Enterprise Resource Planning (ERP) System). Such system boundaries posed a barrier to building business processes that seamlessly include analytical data. Furthermore, previous systems lack availability of descriptive analytics and predictive analysis. Still further, traditional ERP systems utilize row stores, which do not allow the combination of analytical and transactional data within the same business context.

Thus, there is a need to provide methods and systems for combining replicated, analytical and locally generated data in one business object on top of a single database.

SUMMARY

In some implementations, the current subject matter relates to a computer-implemented method. The method can include replicating business data from a first source to an analytics database, generating analytical data based on the replicated business data, combining and storing the replicated business data and the generated analytical data in the analytics database, generating a first data dictionary view by using metadata from the first source, and creating a first business object based on the first data dictionary view, the first business object being accessible by a user interface to provide access to the analytics database. At least one of the above can be performed on at least one processor.

In some implementations, the current subject matter can include one or more of the following optional features. The first business object can be read only. The method can further include generating a second data dictionary view referencing a view in the analytics database, and creating a second business object based on the second data dictionary view, the second business object being accessible by the user interface to provide access to the generated analytical data in the analytics database.

In some implementations, the method can further include displaying the analytical data in response to a database query.

In some implementations, the method can further include creating a local business object for storing local data, the local business object being consumable by the user interface.

In some implementations, the method can further include generating database tables based on the local data in a data dictionary and in the analytics database. The local business object can store data that are not stored in the business data in the first source.

Non-transitory Computer program products are provided that store executable instructions which, when executed by at least one data processor to perform operations herein. Similarly, computer systems are also described that may include a processor and a memory coupled to the processor. The memory may temporarily or permanently store one or more programs that cause the processor to perform one or more of the operations described herein. In addition, operations specified by methods can be implemented by one or more data processors either within a single computing system or distributed among two or more computing systems.

The subject matter described herein provides many advantages. For example, by combining replicated, analytical and locally generated data in one business object on top of a single database, descriptive analytics and predictive analysis can be provided. This also allows business processes that include analytical data to be built.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
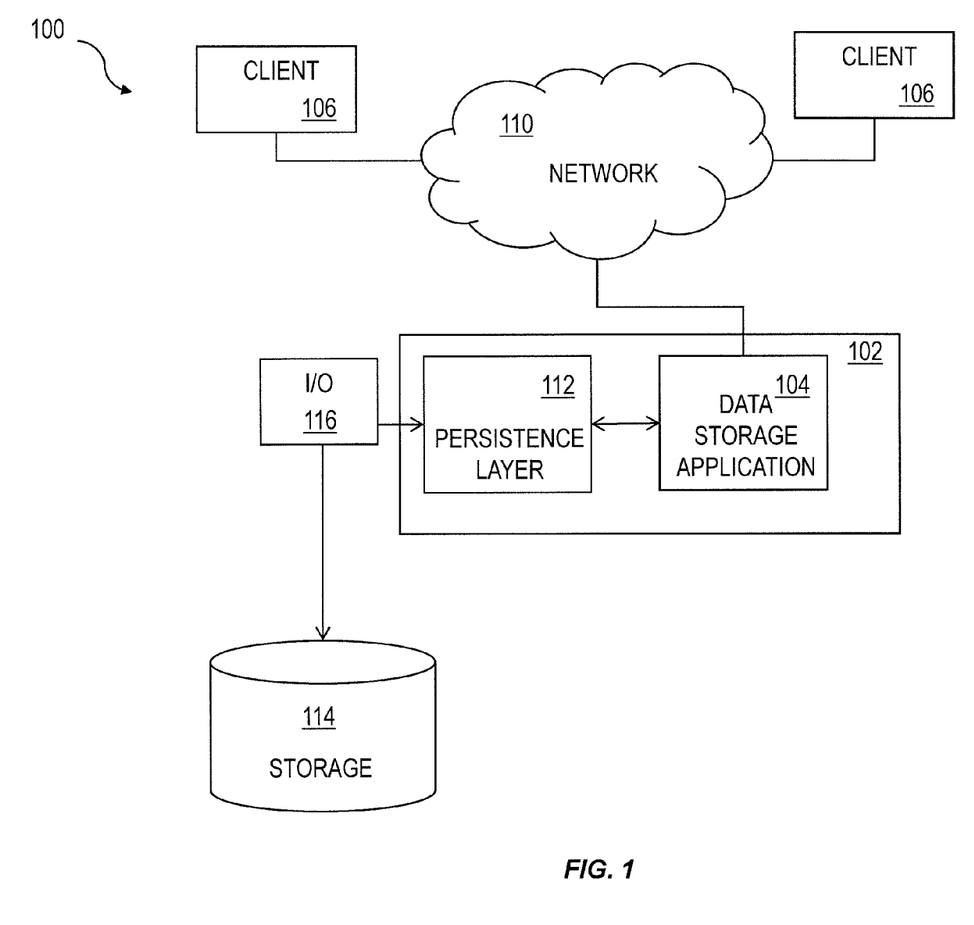
FIG. 1 is a diagram illustrating a system including a data storage application.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 2:
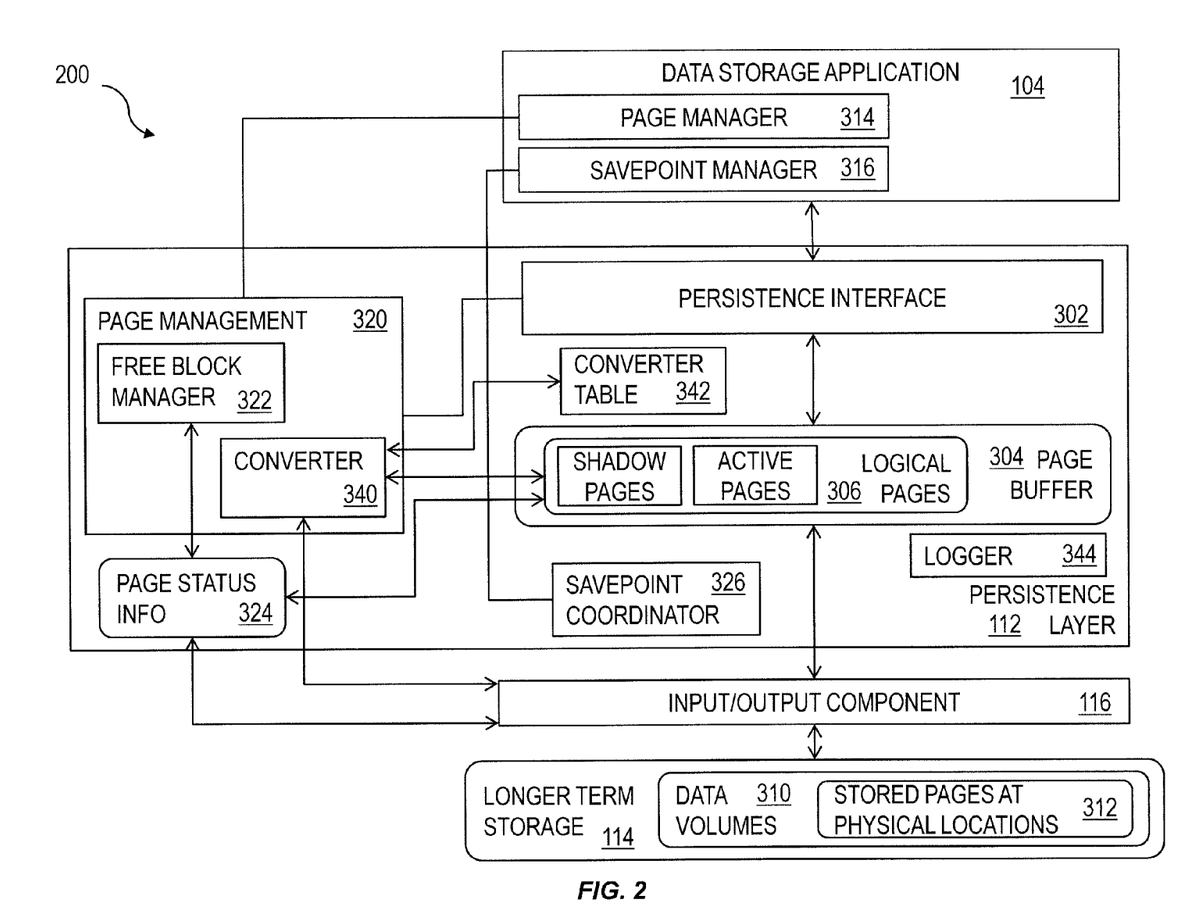
FIG. 2 is a diagram illustrating details of the system of FIG. 1.

FIG. 2 shows a software architecture 200 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 202. A page buffer 204 within the persistence layer 112 can store one or more logical pages 206, and optionally can include shadow pages, active pages, and the like. The logical pages 206 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 210 where stored pages 212 are allocated at physical memory blocks.

In some implementations, the data storage application 104 can include or be otherwise in communication with a page manager 214 and/or a savepoint manager 216. The page manager 214 can communicate with a page management module 220 at the persistence layer 112 that can include a free block manager 222 that monitors page status information 224, for example the status of physical pages within the storage 114 and logical pages in the persistence layer 112 (and optionally in the page buffer 204). The savepoint manager 216 can communicate with a savepoint coordinator 226 at the persistence layer 112 to handle savepoints, which are used to create a consistent persistent state of the database for restart after a possible crash.

In some implementations of a data storage application 104, the page management module of the persistence layer 112 can implement a shadow paging. The free block manager 222 within the page management module 220 can maintain the status of physical pages. The page buffer 204 can included a fixed page status buffer that operates as discussed herein. A converter component 240, which can be part of or in communication with the page management module 220, can be responsible for mapping between logical and physical pages written to the storage 114. The converter 240 can maintain the current mapping of logical pages to the corresponding physical pages in a converter table 242. The converter 240 can maintain a current mapping of logical pages 206 to the corresponding physical pages in one or more converter tables 242. When a logical page 206 is read from storage 114, the storage page to be loaded can be looked up from the one or more converter tables 242 using the converter 240. When a logical page is written to storage 114 the first time after a savepoint, a new free physical page is assigned to the logical page. The free block manager 222 marks the new physical page as "used" and the new mapping is stored in the one or more converter tables 242.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 244 can also be included to store the changes made to the data of the data storage application in a linear log. The logger component 244 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 244 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 112 can use a combination of undo log entries (from one or more logs) and shadow paging.

The persistence interface 202 can handle read and write requests of stores (e.g., in-memory stores, etc.). The persistence interface 202 can also provide write methods for writing data both with logging and without logging. If the logged write operations are used, the persistence interface 202 invokes the logger 244. In addition, the logger 244 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 244. For an entry of type "update", for example, this would be the identification of the affected record and the after image of the modified data.

When the data application 104 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 244 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 244 can write a database log (or simply referred to herein as a "log") sequentially into a memory buffer in natural order (e.g., sequential order, etc.). If several physical hard disks/storage devices are used to store log data, several log partitions can be defined. Thereafter, the logger 244 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 104 can use shadow paging so that the savepoint manager 216 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 3:
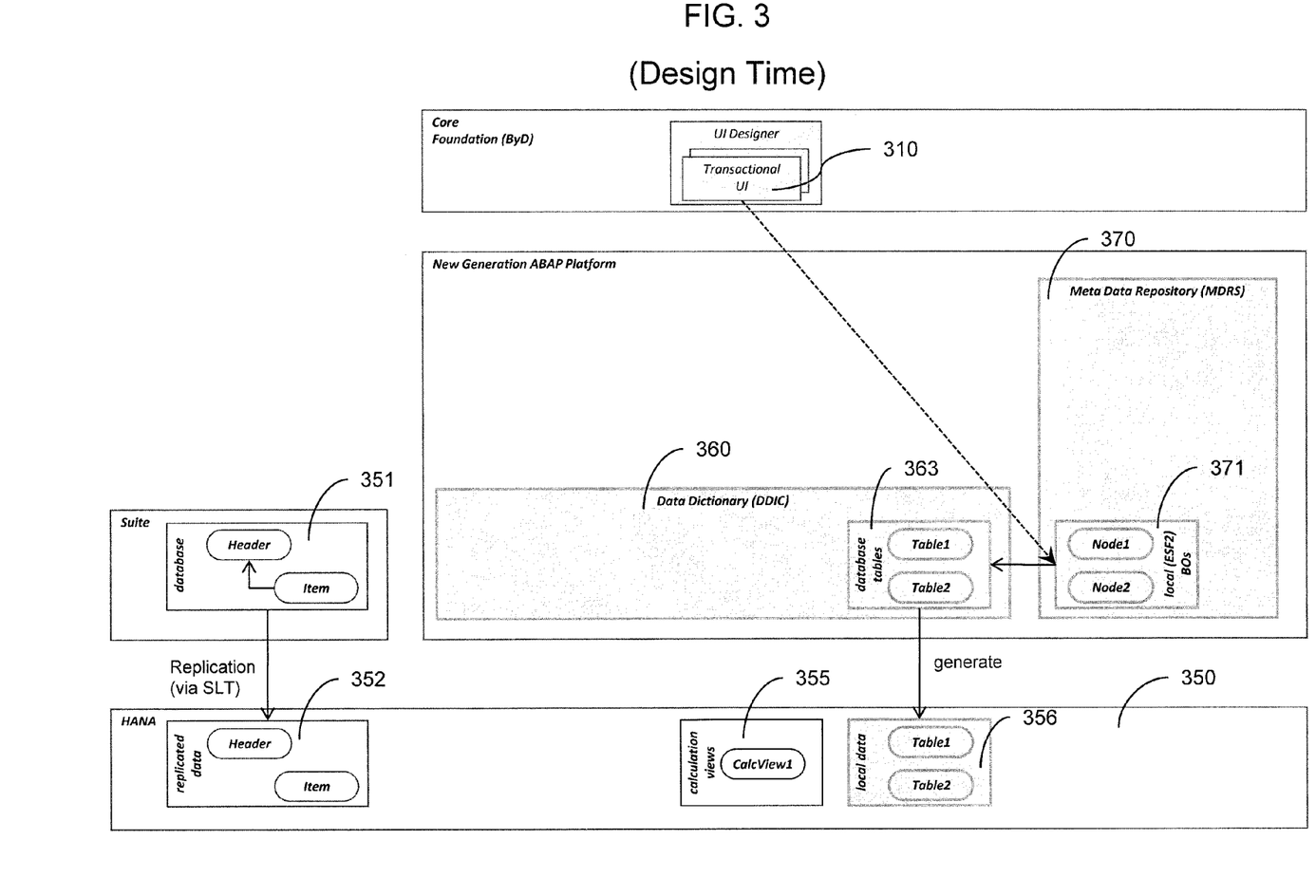
FIGS. 3-6 illustrate an exemplary system and method, according to some implementations of the current subject matter.

References will now be made to FIGS. 3-6, which illustrate an exemplary system and method, according to some implementations of the current subject matter. As illustrated in FIG. 3, a user using a transactional user interface (UI, 310) based on prior ABAP (Advanced Business Application Programming) schema may not be able to access some of the data in a database such as analytics database (AD) 350. Examples of such data include analytical data (calculation views 355) which have been generated based on, for example, data from a Business Suite 351 (e.g. business data, including Customer, Supplier, Plant, etc.). Accordingly, a new generation ABAP platform is provided, which introduces new DDIC (data dictionary, 360) view types. These view types may include, for example, "Replication Projection" views 361 to represent data replicated from the Suite database (e.g. Customer, Supplier, Plant, etc.), and "External" views 362 to represent data locally calculated in the analytics database (e.g. the generated analytical data).

Figure 4:
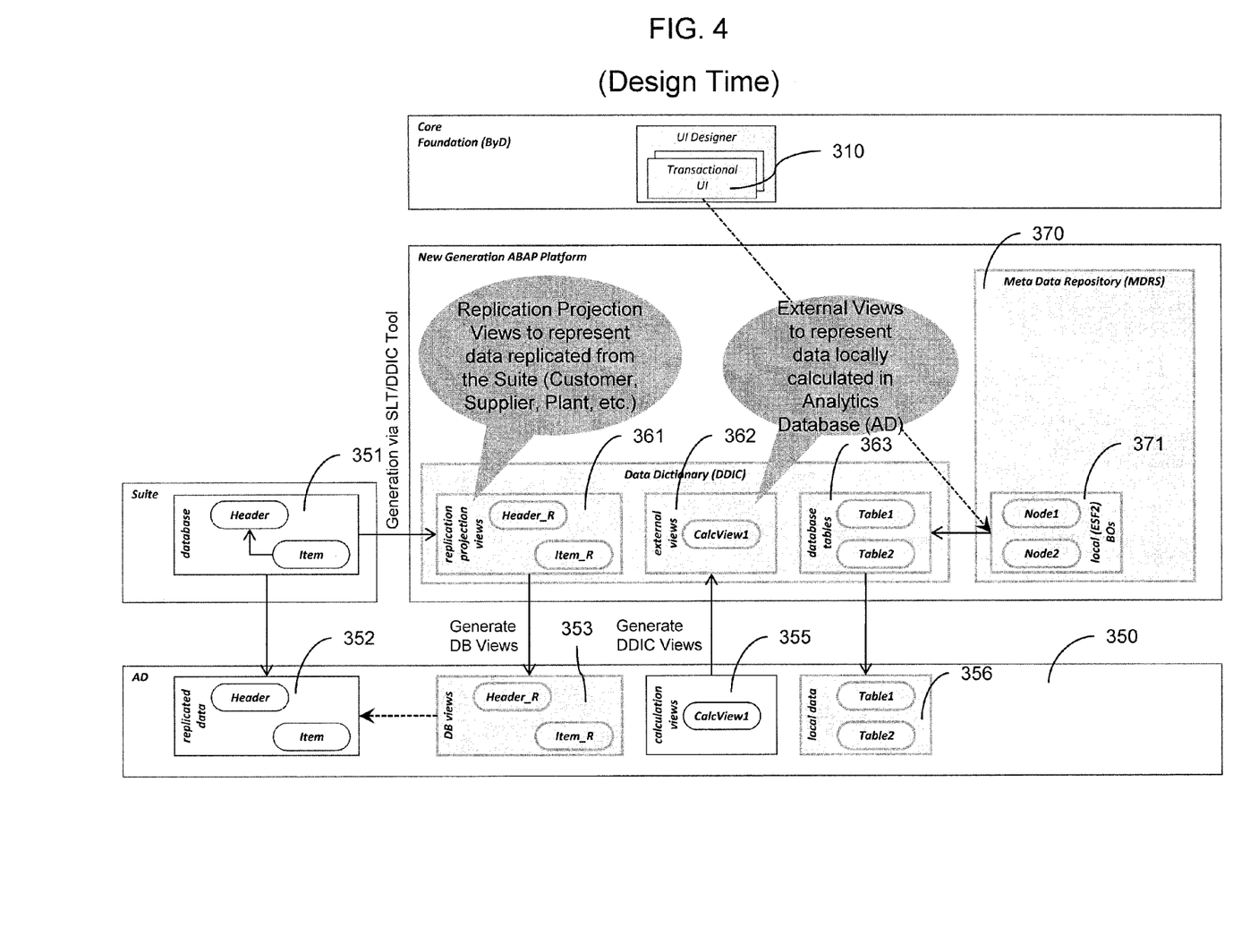

Referring to FIG. 4, Data Dictionary looks to the Business Suite database 551 to see, for example, what the original database table and layout look like. This allows the Replication Projection Views 361 to be generated in the Data Dictionary to represent data replicated from the Suite (e.g. data such as Customer, Supplier, Plant, etc.). The Replication Projection Views 361 generate Database Views 353, which are essentially the same as the Replicated Data 352 of the analytics database 350.

As illustrated in FIG. 4, Calculation Views 555 of the analytics database 350 are generated as External Views 362 in the Data Dictionary to represent data locally calculated in the analytics database 350.

As also illustrated in FIG. 4, local Business Objects are created and stored in the Meta Data Repository (MDRS) and can be consumed by the Transactional User Interface 310. This generates database tables 363 in the data dictionary 360 as well as database tables for local data 356 in the analytics database 350. The local business objects may store data like, for example, additional fields such as URLs of customers, contact persons, main contact person, user IDs (e.g. Facebook ID), as well as various attributes and information not stored in the Business Suite 351.

Figure 5:
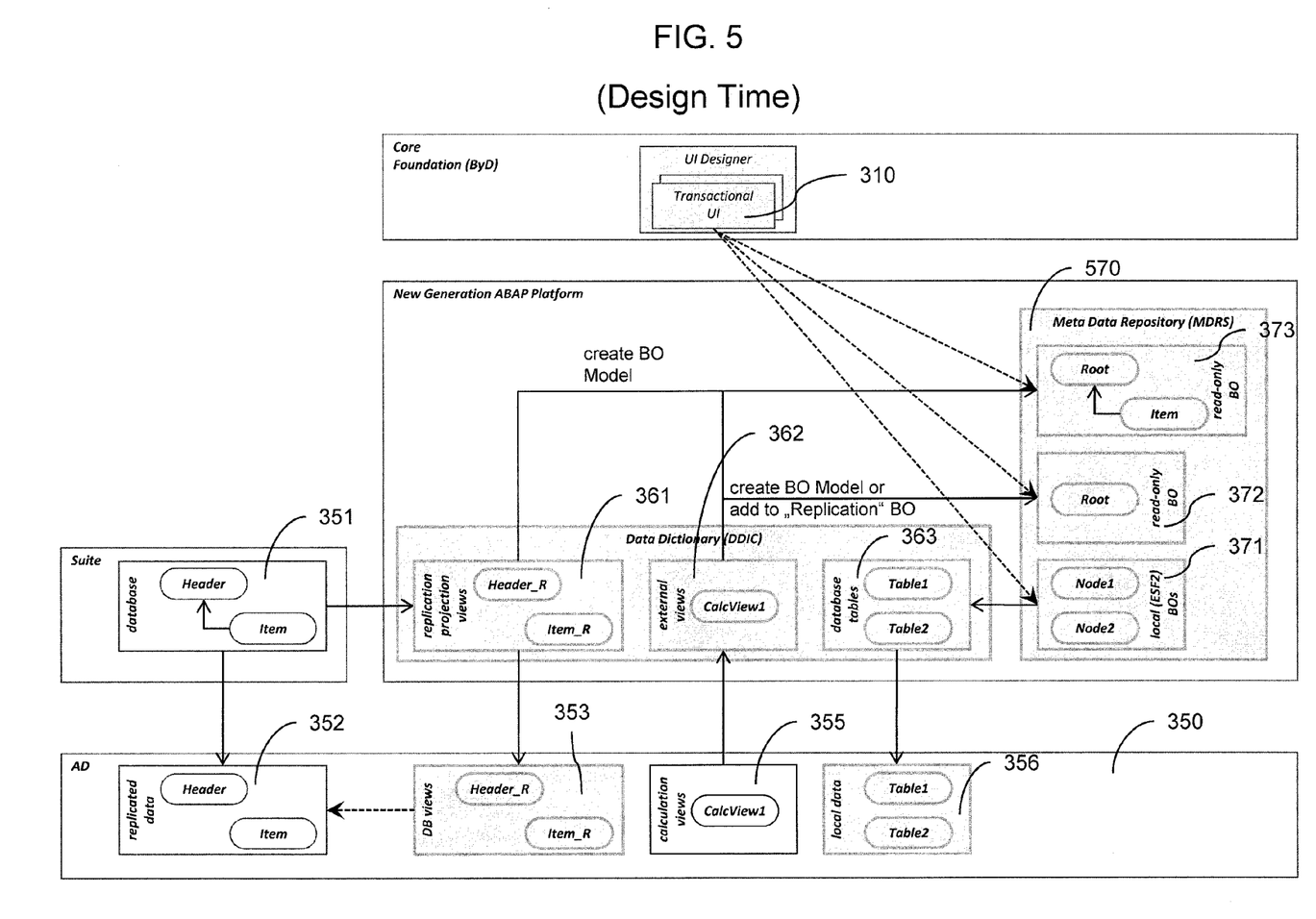
Figure 6:
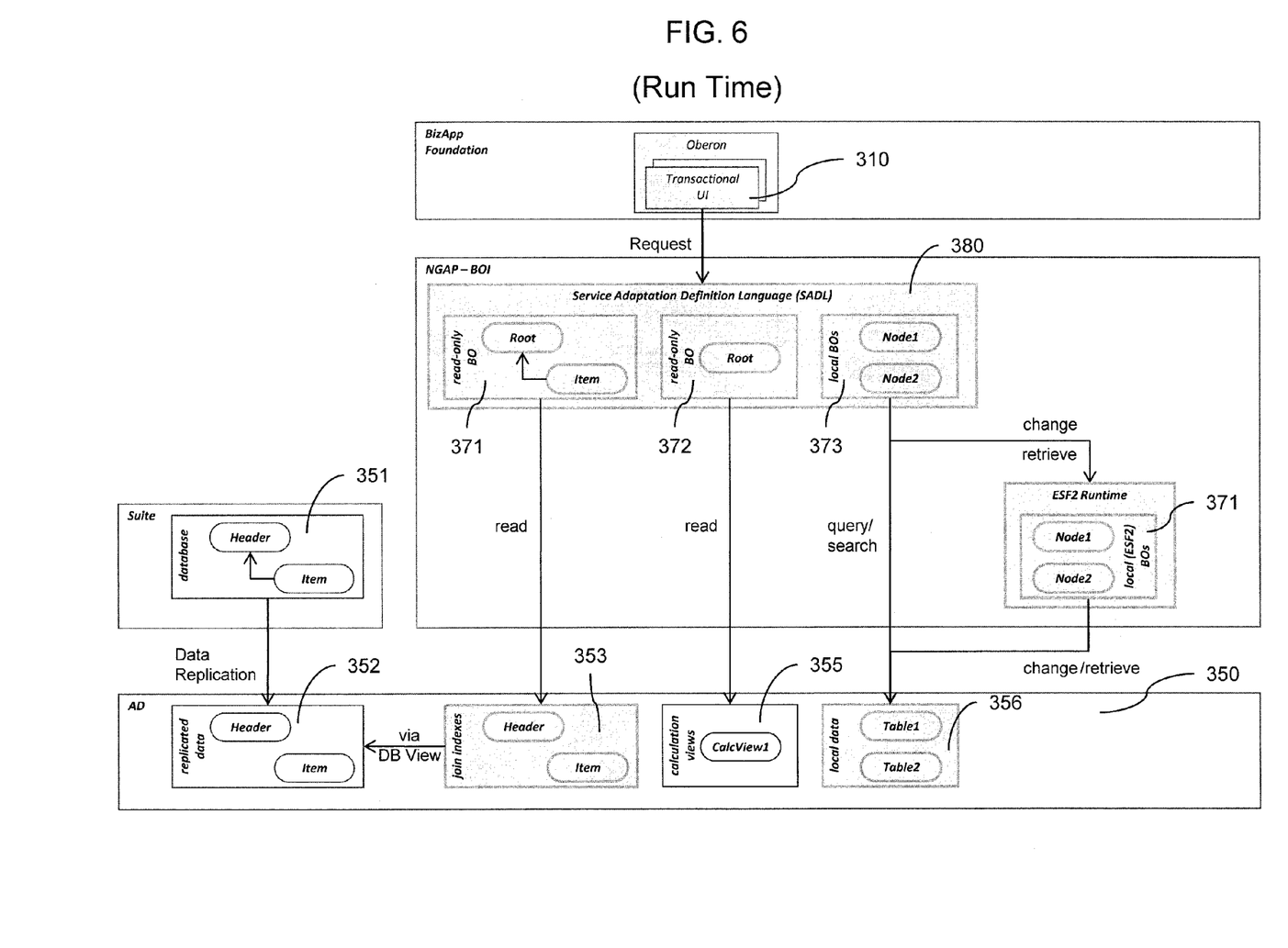

As can be seen in FIG. 5, the Replication Projection Views 361 and the External Views 362 of the Data Dictionary serve as "persistency" for generated "read-only" Business Objects 371 and 372, which are accessible by the Transactional User Interface 310. This allows a user to access all the data in the analytics database 350, including data 352 replicated from the Business Suite 351, analytics data 355, and local data 356. In this way, they can be consumed (accessed) the same way as "normal" BOs. At run time (see FIG. 6), this can be handled by SADL/ESF2 (Service Adaptation Definition Language; no difference to the standard). With regard to read accesses, normal BOs can be handled by SADL/ESF2 (no difference to the standard) and read-only BOs can always be handled by SADL (direct access to the analytics database). As can be seen in FIG. 6, at run time, a user can request various data in the analytics database 350 via various business objects (371, 372, and 373). The user can query/search local data via local business objects 373, and change and/or retrieve local data via the local business objects 373 through ESF2 Runtime 371.

In summary, the present subject matter fills the gaps for incorporating business and analytical logic on top of an in-memory database containing replicated and locally calculated data by:

1. Making replicated and locally generated data accessible from ABAP using the newly introduced data dictionary view types—"Replication Projection" view and "external" View (FIG. 4); and 2. Making generated and locally available data available for consumers (e.g. via the user interface) by introducing "read-only" business objects, that use the newly introduced view types (FIG. 5).

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A computer-implemented method, comprising:
   replicating business data from a first source to an analytics database;
   generating analytical data based on the replicated business data;
   combining and storing the replicated business data and the generated analytical data in the analytics database;
   generating a first data dictionary view by using metadata from the first source; and
   creating a first business object based on the first data dictionary view, the first business object being accessible by a user interface to provide access to the analytics database;
   wherein at least one of the above is performed on at least one processor.

2. A computer-implemented method according to claim 1, further comprising:
   generating a second data dictionary view referencing a view in the analytics database; and
   creating a second business object based on the second data dictionary view, the second business object being accessible by the user interface to provide access to the generated analytical data in the analytics database.

3. A computer-implemented method according to claim 1, further comprising displaying the analytical data in response to a database query.

4. A computer-implemented method according to claim 1, wherein the first business object is read only.

5. A computer-implemented method according to claim 1, further comprising creating a local business object for storing local data, the local business object being consumable by the user interface.

6. A computer-implemented method according to claim 5, further comprising:
   generating database tables based on the local data in a data dictionary and in the analytics database.

7. A computer-implemented method according to claim 6, wherein the local business object stores data that are not stored in the business data in the first source.

8. A computer program product comprising a non-transitory machine-readable medium storing instructions that, when executed by at least one programmable processor, cause the at least one programmable processor to perform operations comprising:
   replicating business data from a first source to an analytics database;
   generating analytical data based on the replicated business data;
   combining and storing the replicated business data and the generated analytical data in the analytics database;
   generating a first data dictionary view by using metadata from the first source; and
   creating a first business object based on the first data dictionary view, the first business object being accessible by a user interface to provide access to the analytics database.

9. A computer program product according to claim 8, wherein the operations further comprises:
   generating a second data dictionary view referencing a view in the analytics database; and
   creating a second business object based on the second data dictionary view, the second business object being accessible by the user interface to provide access to the generated analytical data in the analytics database.

10. A computer program product according to claim 8, wherein the operations further comprises displaying the analytical data in response to a database query.

11. A computer program product according to claim 8, wherein the first business object is read only.

12. A computer program product according to claim 8, wherein the operations further comprises creating a local business object for storing local data, the local business object being consumable by the user interface.

13. A computer program product according to claim 12, wherein the operations further comprises generating database tables based on the local data in a data dictionary and in the analytics database.

14. A computer program product according to claim 12, wherein the local business object stores data that are not stored in the business data in the first source.

15. A system comprising:
   at least one programmable processor; and
   a machine-readable medium storing instructions that, when executed by the at least one programmable processor, cause the at least one programmable processor to perform operations comprising:
      replicating business data from a first source to an analytics database;
      generating analytical data based on the replicated business data;

combining and storing the replicated business data and the generated analytical data in the analytics database;

generating a first data dictionary view by using metadata from the first source; and creating a first business object based on the first data dictionary view, the first business object being accessible by a user interface to provide access to the analytics database.

16. A system according to claim 15, wherein the operations further comprises:

generating a second data dictionary view referencing a view in the analytics database; and creating a second business object based on the second data dictionary view, the second business object being accessible by the user interface to provide access to the generated analytical data in the analytics database.

17. A system according to claim 15, wherein the operations further comprises displaying the analytical data in response to a database query.

18. A system according to claim 15, wherein the operations further comprises creating a local business object for storing local data, the local business object being consumable by the user interface.

19. A system according to claim 18, wherein the operations further comprises generating database tables based on the local data in a data dictionary and in the analytics database.

20. A system according to claim 18, wherein the local business object stores data that are not stored in the business data in the first source.

* * * * *